(12) United States Patent
Deseyne et al.

(10) Patent No.: US 7,866,349 B2
(45) Date of Patent: Jan. 11, 2011

(54) HEDDLE FRAME WITH REINFORCING PROFILE FOR A WEAVING MACHINE

(75) Inventors: Joost Deseyne, Hooglede (BE); Frank Stockman, Kortrijk (BE)

(73) Assignee: Picanol N.V. and Verbrugge N.V., Ieper (BG)

( * ) Notice: Subject to any disclaimer, the term of this patent is extended or adjusted under 35 U.S.C. 154(b) by 0 days.

(21) Appl. No.: 12/444,436

(22) PCT Filed: Oct. 5, 2007

(86) PCT No.: PCT/EP2007/008671

§ 371 (c)(1),
(2), (4) Date: Apr. 6, 2009

(87) PCT Pub. No.: WO2008/040559

PCT Pub. Date: Apr. 10, 2008

(65) Prior Publication Data

US 2010/0043907 A1      Feb. 25, 2010

(30) Foreign Application Priority Data

Oct. 5, 2006     (BE) ................................ 2006/0497

(51) Int. Cl.
*D03C 9/02* (2006.01)
*D03C 9/06* (2006.01)
*D03C 9/00* (2006.01)

(52) U.S. Cl. .......................................... 139/91; 139/92
(58) Field of Classification Search .................. 139/91, 139/92
See application file for complete search history.

(56) References Cited

U.S. PATENT DOCUMENTS

| 3,754,577 | A |   | 8/1973  | Heller |       |
|-----------|---|---|---------|--------|-------|
| 4,476,900 | A | * | 10/1984 | Bowen  | 139/91 |
| 4,484,604 | A | * | 11/1984 | Kramer et al. | 139/92 |
| 4,582,738 | A |   | 4/1986  | Kunert |       |
| 4,750,457 | A |   | 6/1988  | Bonutti |      |
| 4,790,357 | A | * | 12/1988 | Kramer | 139/91 |
| 4,844,130 | A | * | 7/1989  | Blontrock | 139/92 |

(Continued)

FOREIGN PATENT DOCUMENTS

BE          525339          1/1954

(Continued)

OTHER PUBLICATIONS

International Search Report in PCT/EP2007/008671, Feb. 28, 2008.

*Primary Examiner*—Bobby H Muromoto, Jr.
(74) *Attorney, Agent, or Firm*—Bacon & Thomas, PLLC

(57) ABSTRACT

Heddle frame having a transverse beam (2, 3) comprising a transverse profile (22, 63) and a reinforcing profile (20, 21, 52, 57, 58, 61, 62) which are glued to one another, the transverse beam (2, 3) having an undulating adhesive surface (46, 47, 48, 51, 55, 56, 59, 60) which can interact with an adhesive (42) which extends between the transverse profile (22, 63) and the reinforcing profile (20, 21, 52, 57, 58, 61, 62) in order to glue the transverse profile (22, 63) and the reinforcing profile (20, 21, 52, 57, 58, 61, 62) to one another. Transverse beam for a heddle frame and method for producing a heddle frame.

15 Claims, 9 Drawing Sheets

U.S. PATENT DOCUMENTS

| | | | | |
|---|---|---|---|---|
| 4,913,194 A | * | 4/1990 | Kramer | 139/91 |
| 5,280,810 A | * | 1/1994 | Shimizu | 139/91 |
| 5,335,699 A | | 8/1994 | Beyaert | |
| 5,411,061 A | | 5/1995 | Faase | |
| 5,819,810 A | | 10/1998 | Kramer | |
| 6,789,580 B1 | | 9/2004 | Cardoen | |
| 6,926,042 B2 | * | 8/2005 | Scheiwe | 139/91 |
| 6,994,123 B2 | * | 2/2006 | Mettler | 139/93 |
| 7,261,942 B2 | | 8/2007 | Andrews | |
| 2003/0140981 A1 | * | 7/2003 | Scheiwe | 139/91 |
| 2005/0061385 A1 | * | 3/2005 | Gesing | 139/91 |
| 2005/0081941 A1 | * | 4/2005 | Schmid et al. | 139/91 |
| 2005/0241718 A1 | * | 11/2005 | Froment | 139/91 |

FOREIGN PATENT DOCUMENTS

| | | |
|---|---|---|
| DE | 818280 | 10/1951 |
| WO | 2006008042 A2 | 1/2006 |

\* cited by examiner

HEDDLE FRAME WITH REINFORCING PROFILE FOR A WEAVING MACHINE

The invention relates to a transverse beam for a heddle frame, a heddle frame provided with a transverse beam of this type and a method for producing a transverse beam of this type.

With weaving machines, a heddle frame is used to control warp threads in order to form a shed of warp threads. A heddle frame is driven by a drive mechanism, such as a dobby, a cam box, an eccentric mechanism or any other drive mechanism of this type. The drive mechanism may impose a desired movement path on the heddle frame.

With fast weaving machines, a heddle frame is usually subjected to considerable mechanical loads. These loads limit the maximum permissible weaving speed at which a heddle frame can be used without risking fractures. It is known to reinforce a heddle frame in order to prevent fractures of heddle frames or in order to increase the maximum permissible weaving speed. BE 525339 and U.S. Pat. No. 2,601,873 describe a heddle frame wherein the transverse beams have a reinforcing profile. In this case, a substantially U-shaped reinforcing profile is provided both at the top and at the bottom of the heddle frame. U.S. Pat. No. 3,754,577 describes a heddle frame which comprises transverse beams which are substantially formed by a light-metal hollow transverse profile to which a plurality of reinforcing profiles are glued. In order to meter the adhesive at the adhesive surface of the transverse beam, the above document proposes to provide spacing ribs on the adhesive surface of the transverse profile or to provide a fibreglass fabric there. EP 1516948 also describes a heddle frame which comprises transverse beams which are essentially formed by a transverse profile to which a reinforcing profile has been attached. In order to meter the adhesive on the adhesive surface of the transverse beam, the document proposes that spacing ribs or studs be provided or that glass spheres be provided in the adhesive.

With the above-described features for metering adhesive on the adhesive surface of the transverse beam, the amount of adhesive which ensures the adhesive action is affected by changes in size which are due to tolerances of the spacing ribs, studs, spheres and/or fibres. In addition, the introduction of, for example, optical fibres or glass spheres weakens the adhesive bond. Furthermore, the abrupt transitions at the spacing ribs or studs during gluing may give rise to the formation of air bubbles or air pockets in the adhesive. This also weakens the adhesive bond.

It is an object of the invention to provide a transverse beam with a reinforcing profile for a heddle frame which is sufficiently strong to make high weaving speeds or high loads possible.

In order to achieve this object, a transverse beam according to the invention comprises a transverse profile and a reinforcing profile which are glued to one another, with the transverse beam having an undulating adhesive surface which can interact with adhesive which extends between the transverse profile and the reinforcing profile in order to glue the transverse profile and the reinforcing profile to one another.

Providing an undulating adhesive surface according to the invention is advantageous in order to form an adhesive bond between the transverse profile and the reinforcing profile. Within the same limited fitting space, not only is the surface of the undulating adhesive surface significantly larger than the surface of a flat adhesive surface, but more-over the adhesive bond is hardly affected by tolerances of the transverse profile and/or of the reinforcing profile. In addition, the undulating adhesive surface is expedient in order to prevent air bubbles or air pockets which may occur during gluing. The invention also makes it possible for an adhesive to spread easily and evenly over the adhesive surface. This makes for a strong and reliable adhesive bond. In addition, the undulating adhesive surface is expedient in order to evenly spread loads at the adhesive surface which result from forces which are exerted on the heddle frame. As a result, the heddle frame can be subjected to high loads without the risk of the adhesive bond being damaged. This allows the heddle frame to be used at high weaving speeds during which high loads occur.

According to a preferred embodiment, the transverse beam comprises a transverse profile provided with an undulating adhesive surface. According to one embodiment, the transverse beam comprises a transverse profile provided with a collar to which transverse beam a substantially U-shaped reinforcing profile is glued, wherein the collar can be fitted inside a groove in the U-shaped reinforcing profile and has an undulating adhesive surface. With such an embodiment, a transverse profile can be reinforced by means of a reinforcing profile in a simple manner without the strength of the transverse profile being adversely affected.

According to one embodiment, the undulating adhesive surface according to the invention extends over at least the top flank and/or side flank of the collar. This is advantageous for metering the amount of adhesive which is applied between the transverse profile and the reinforcing profile. This also makes it possible to apply a relatively large amount of adhesive in an even manner and to spread it between the U-shaped reinforcing profile and the collar of the transverse profile. Such an embodiment makes it possible to create a good adhesive bond, even if the positioning of the transverse profile and the reinforcing profile with respect to one another is less accurate.

According to one embodiment, a specific space is provided at the ends of the legs of the U-shaped reinforcing profile, between said ends and the transverse profile. This space is able to accommodate an amount of adhesive which is gradually pushed out when the reinforcing profile is applied to the transverse profile. This offers the advantage that all of the adhesive can remain within the transverse beam, so that no adhesive has to be removed after gluing. In addition it is also possible to form an adhesive bond between the ends of the legs of the reinforcing profile and the transverse profile. The gradual movement of the adhesive and the undulating shape of the adhesive surface according to the invention also ensure that the adhesive is evenly distributed and that any air bubbles which might be present in the adhesive are forced out in this way and can escape.

According to one embodiment, the undulating adhesive surface has longitudinal undulations which extend in the length direction of the transverse beam. The distance between the longitudinal undulations is, for example, in the order of magnitude of 0.5 mm. Such longitudinal undulations can easily be produced while the transverse profile is being drawn using a die.

According to one embodiment, at least the base surface of the reinforcing profile is of a structured design. This is not only advantageous in order to spread the adhesive, but also increases the surface area over which the adhesive and the reinforcing profile contact one another. Such a base surface can be created by providing a structured strip on the base surface while the reinforcing profile is being drawn using a die. When this structured strip is removed, a structured base surface is revealed, for example a serrated base surface.

According to one embodiment, a transverse profile is formed by a hollow transverse profile made from a light metal, for example in aluminium or in an aluminium alloy.

According to one embodiment, a reinforcing profile is formed by a fibre-reinforced synthetic material, for example a carbon fibre-reinforced synthetic material, a glass fibre-reinforced synthetic material or a Kevlar fibre-reinforced synthetic material. In this case, the transverse profile and the reinforcing profile can be glued to one another using an adhesive, for example a glue based on epoxy resin, an adhesive based on acrylate or any other adhesive which is suitable for forming a good bond between a light metal and a fibre-reinforced synthetic material.

The invention also relates to a method for producing a transverse beam for a heddle frame according to the invention. Such a method comprises providing an undulating adhesive surface in order to glue a transverse profile and a reinforcing profile of a transverse beam to one another. This method makes it possible to apply a metered amount of adhesive between the transverse profile and the reinforcing profile.

In order to further clarify the features and further advantages of the invention, the invention is described in more detail with reference to drawings of exemplary embodiments, in which:

FIG. 1 diagrammatically illustrates a heddle frame according to the invention;

Figure 1:
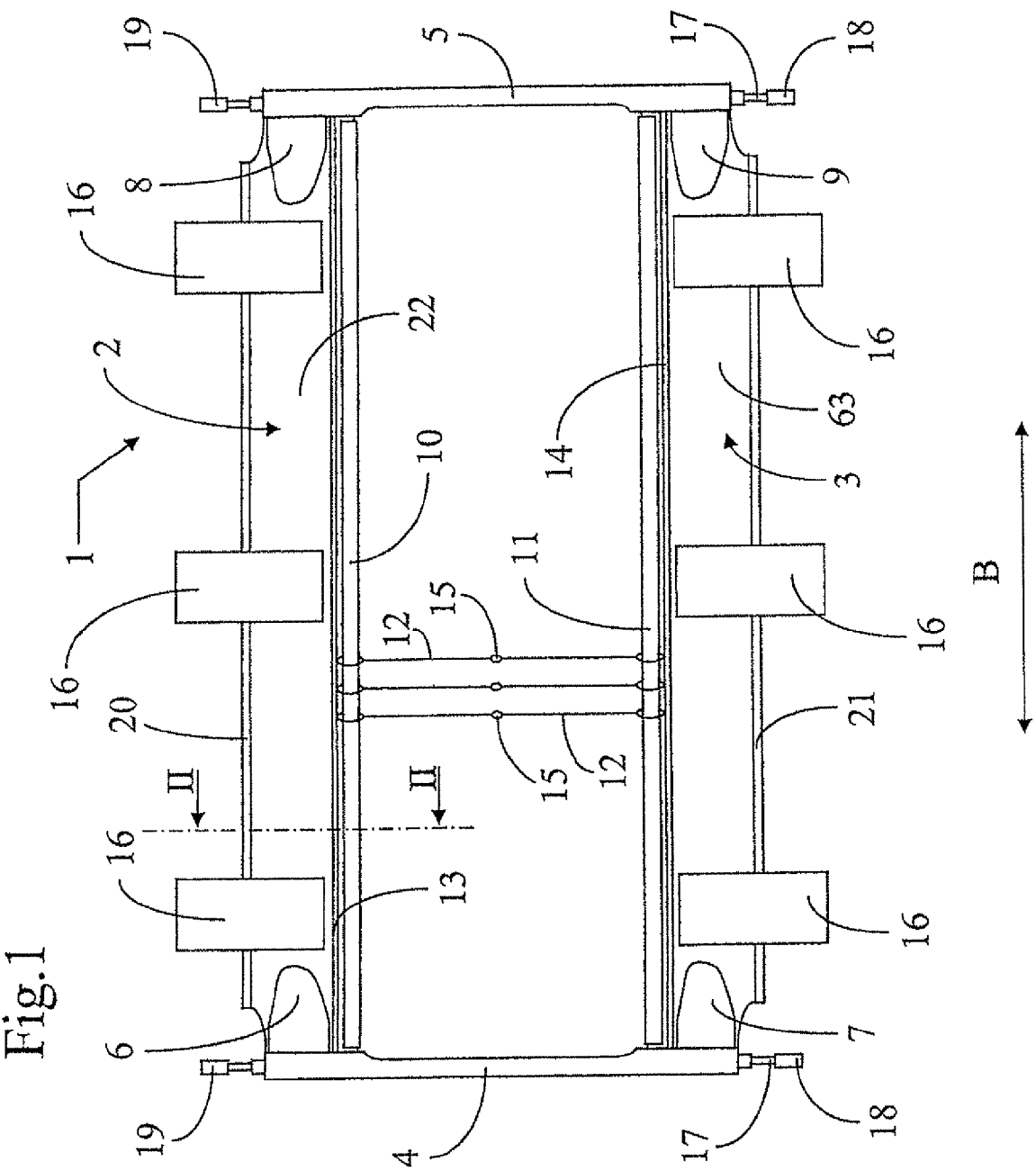

FIG. 1 shows a heddle frame 1. The heddle frame 1 comprises a top transverse beam 2 and a bottom transverse beam 3. The transverse beams 2 and 3 are connected to one another by two lateral supports 4 and 5, more in particular by corner joints 6, 7, 8 and 9. The corner joints are, for example, of similar design to those described in DE 19816950 or EP 659917. A top heddle bar 10 is arranged near the top transverse beam 2, while a bottom heddle bar 11 is arranged near the bottom transverse beam 3. In addition, a damping element 13 and 14 for the heddles 12 may be arranged at the height of each transverse beam 2 and 3, which damping element 13 and 14 is of similar design, for example, to that described in WO 01/48284. The heddles 12 are arranged between the two heddle bars 10 and 11 and comprise a wire eye 15 for guiding a warp thread.

Furthermore, it is possible to arrange known guide elements 16 on each transverse beam 2, 3. In the embodiment shown by way of illustration, a threaded rod 17 is arranged near each lateral support 4 and 5, comprising a coupling element 18 for connecting the threaded rod 17 with a drive mechanism (not shown). The threaded rod 17 also comprises an adjustment unit 19 for adjusting the threaded rod 17 relative to a lateral support 4 or 5 Such a threaded rod 17 and an associated drive mechanism are, for example, known from EP 520540. The heddle frame 1, as illustrated in FIG. 1, comprises a top reinforcing profile 20 which forms part of the transverse beam 2 and a bottom reinforcing profile 21 which forms part of the transverse beam 3.

Figure 2:
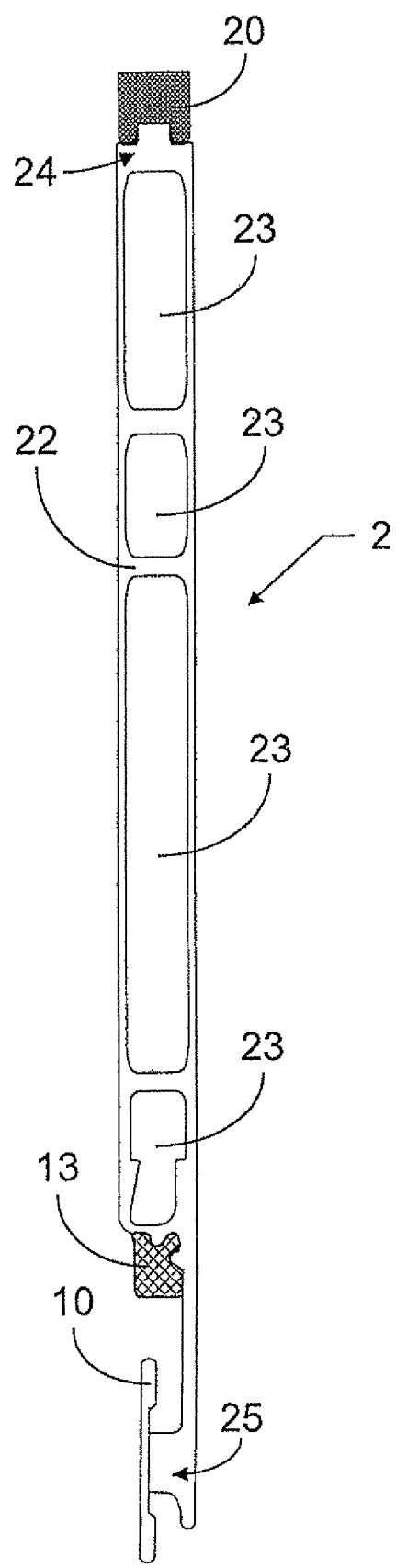
FIG. 2 shows a cross section along line II-II of a heddle frame according to FIG. 1.

As illustrated in FIG. 2, the transverse beam 2 comprises a hollow transverse profile 22 to which a heddle bar 10 is attached in a known manner. This hollow transverse profile 22 comprises a plurality of cavities 23. A reinforcing profile 20 is attached at the height of the far side 24 of the hollow transverse profile 22 in order to reinforce the transverse beam 2.

The far side 24 is situated opposite the far side 25 of the transverse profile 22 where the heddle bar 10 is located. A damping element 13 is also attached to this transverse profile 22 in a known manner.

Figure 3:
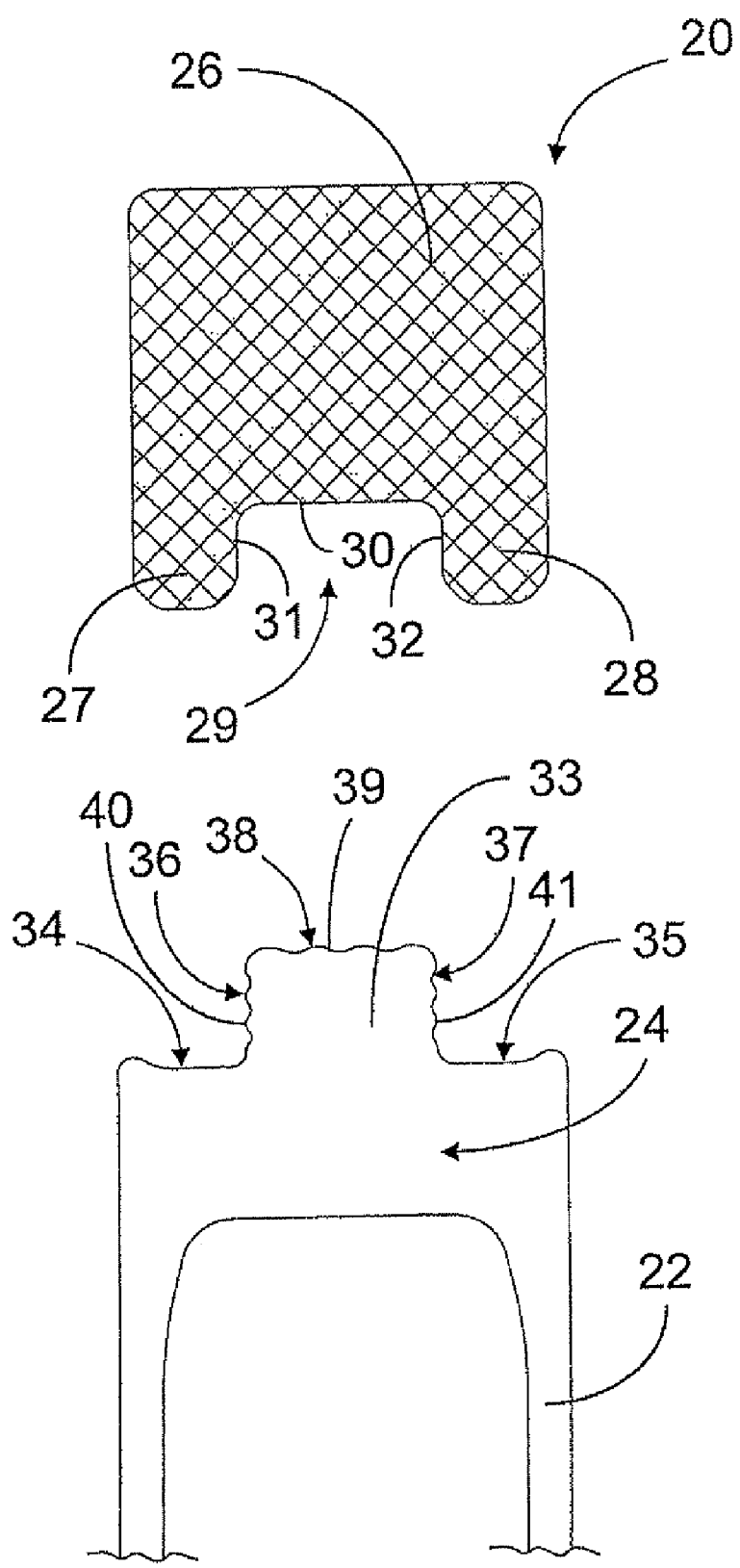
FIG. 3 shows an enlarged view of the transverse profile and the reinforcing profile in the non-fitted state.

As illustrated in FIG. 3, the reinforcing profile 20 comprises a base element 26 and two legs 27 and 28 which together form a substantially U-shaped profile. The reinforcing profile 20 comprises a groove 29 which is delimited by a base surface 30 and lateral surfaces 31 and 32 of the legs 27 and 28. The lateral surfaces 31 and 32 are arranged substantially at right angles to the base surface 30 and substantially parallel to one another. A reinforcing profile 20 consists of a material having a relatively high strength. Such a material is, for example, a synthetic material which is reinforced, for example with carbon fibres, Kevlar fibres, glass fibres or other high-strength fibres. The reinforcing profile 20 is, for example, made using a drawing process wherein synthetic material is drawn through a die together with strong, elongate fibres. In this case, a structured band is preferably also arranged on the base surface 30 of the reinforcing profile 20 during this drawing process. Following the drawing process, this structured band can be removed again, as a result of which a structured base surface 30 is obtained, that is to say a base surface 30 having an uneven structure, for example a structure analogous to the structure of the removed structured band. If a structured band consisting of a textile band is used, for example a linen weave fabric, a reinforcing profile with an essentially serrated base surface is obtained in this case. According to a variant, a lateral surface 31 and/or 32 may also be of a structured design. According to a variant, the structured band may also consist of a strip, for example a structured strip made of plastic.

The hollow transverse profile 22 is made from light metal, such as aluminium, an alloy based on aluminium, another light metal or an alloy based on another light metal. A transverse profile 22 of this type can also be drawn. A hollow transverse profile 22 is relatively light and suitable for use at high weaving speeds. A hollow transverse profile 22 of this type which is reinforced according to the invention with a reinforcing profile 20 can be used at even higher weaving speeds. The reinforcing profile 20 may be made of significantly stronger material than the transverse profile 22. The reinforcing profile 20 is preferably made of a material having a relatively high modulus of rigidity and a relatively low specific weight, more in particular having a favourable strength-to-weight ratio.

The far side 24 of the transverse profile 22 comprises a collar 33 and two lateral flanks 34 and 35 which are provided on either side of said collar 33. The collar 33 in this case has substantially parallel side flanks 36, 37 and a top flank 38 which is arranged substantially at right angles to the side flanks 36, 37. The surfaces of the side flanks 36, 37 and of the top flank 38 are of undulating design. Here, the top flank 38 has several longitudinal undulations 39 (i.e., having a wave-like form, including valleys and peaks), the side flank 36 has several longitudinal undulations 40 and the side flank 37 has several longitudinal undulations 41. These longitudinal undulations 39, 40 and 41 extend along the length direction B of the transverse beam 2. The undulating shape of the longitudinal undulations 39, 40 and 41 can be achieved during the drawing of the transverse profile 22 through a die. During this drawing process, several longitudinal undulations 39, 40 and 41 in the length direction B (FIG. 1) of the transverse profile 22 are produced.

Figure 4:
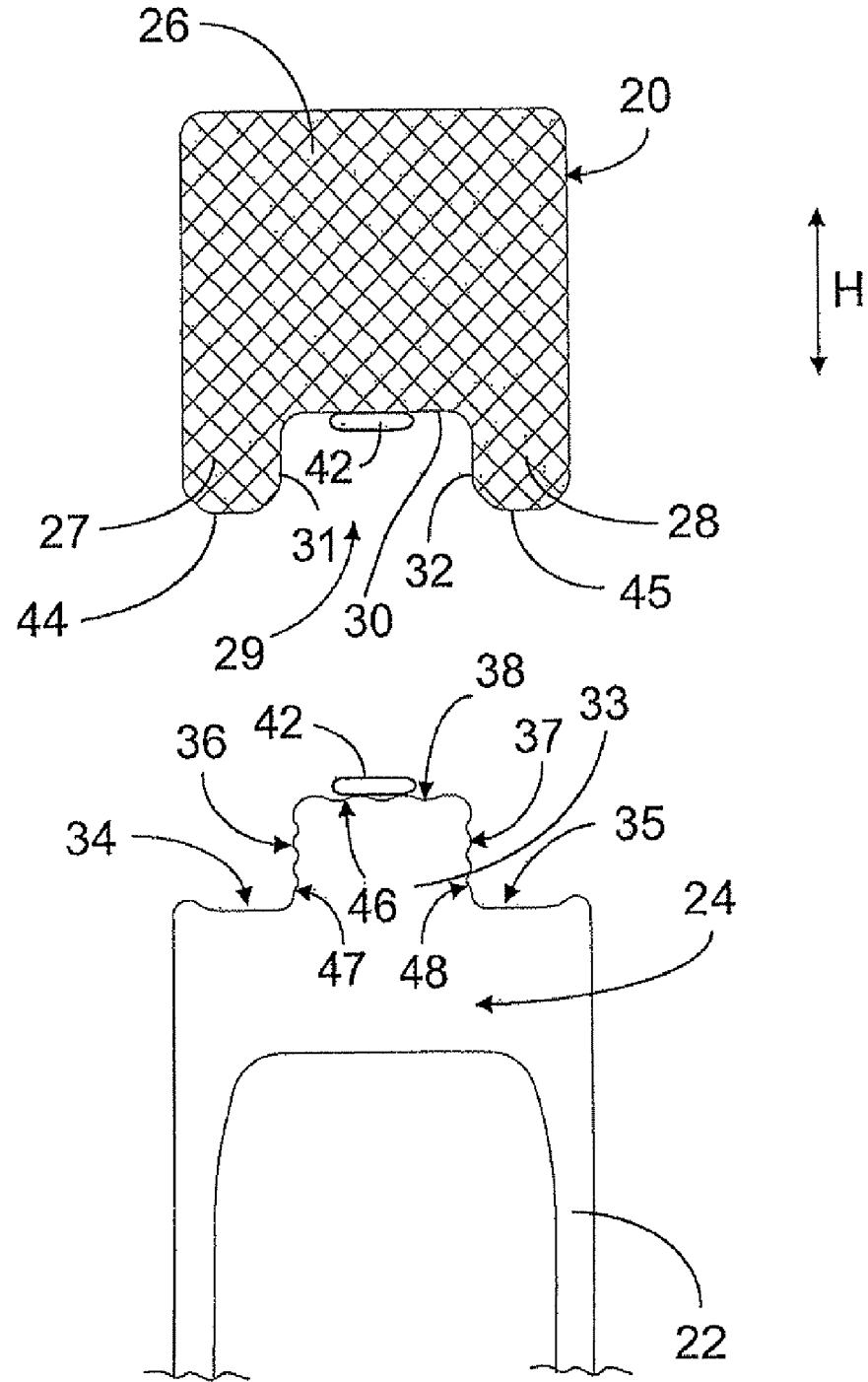
FIG. 4 shows the section from FIG. 3 before fitting.
Figure 5:
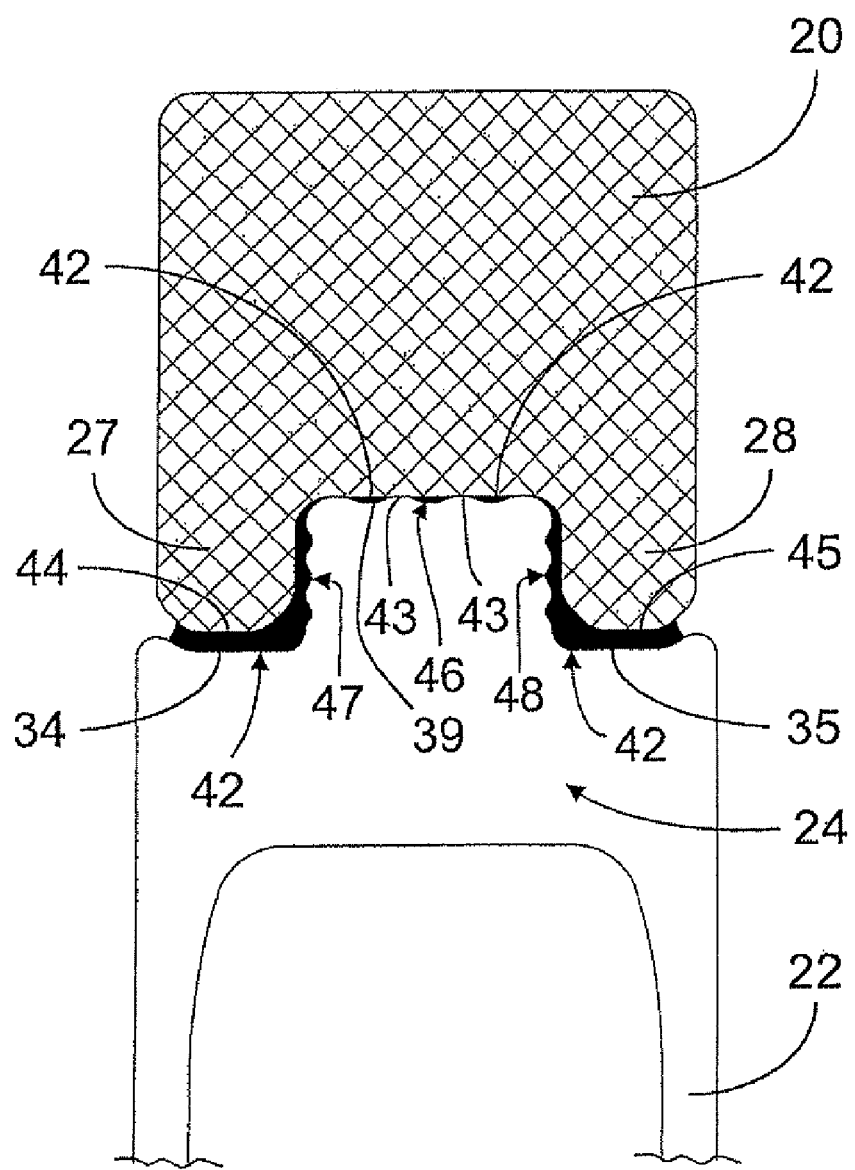
FIG. 5 shows the section from FIG. 3 in the fitted state.

Before the reinforcing profile 20 is attached to the transverse profile 22, a metered amount of adhesive 42 is applied to the base surface 30 of the reinforcing profile 20 and/or a metered amount of adhesive 42 is applied to the top flank 38 of the collar 33, as illustrated in FIG. 4. Subsequently, the reinforcing profile 20 and the transverse profile 22 are pressed together in the direction H, into a position as illustrated in FIG. 5. In this case, the collar 33 is arranged in the groove 29 of the U-shaped reinforcing profile 20. In this case, the adhesive 42 is also applied between both and evenly spread or distributed between both. In order to produce a good adhesive bond, both are pressed together firmly, for example by means of a pressing device, for example a conventional pressing device, similar to that described in U.S. Pat. No. 3,754,577. As a result thereof, the transverse profile 22 and the reinforcing profile 20 are also accurately aligned with respect to one another. In this case, the top flank 38 of the transverse profile 22 is situated virtually against the base surface 30 of the reinforcing profile 20, which means that for example only the tops or peaks 43 of the longitudinal undulations 39 touch the base surface 30, thereby forming wave-like undulations in the adhesive 42. This makes it possible to place one against the other, while there still remains sufficient amount of adhesive 42 between the two in order to glue the reinforcing profile 20 and the transverse profile 22 to one another. In this case, the ends 44, 45 of the legs 27, 28 are at a distance from the flanks 34, 35 of the transverse profile 22. The adhesive 42 also spreads between the lateral surfaces 31, 32 of the groove 29 and the side flanks 36, 37 of the collar 33, so that an adhesive bond is also created in those locations. The remaining amount of adhesive 42 spreads between the ends 44, 45 of the legs 27, 28 of the U-shaped reinforcing profile 20 and the flanks 34, 35 of the transverse profile 22. Subsequently, the adhesive 42 can cure, for example cure thermally, so that the two parts are glued together perfectly. According to this method, an undulating adhesive surface is provided in order to glue the transverse profile 22 and the reinforcing profile 20 to one another, so that both are glued together by means of, inter alia, an undulating adhesive surface 46, 47 and 48 which is provided on the top flank 38, the side flank 36 and the side flank 37.

As can be seen in FIG. 5, an undulating adhesive surface 46 is formed on the top flank of the collar 33 of the transverse profile 22. In addition, undulating adhesive surfaces 47 and 48 are formed on the side flanks of the collar. The adhesive surfaces 46, 47 and 48 interact with the adhesive 42 which extends between the transverse profile 22 and the reinforcing profile 20 in order to glue both together. In addition, adhesive surfaces are provided between the adhesive 42 and the groove 29 in the substantially U-shaped reinforcing profile 20. The transverse profile 22 normally has a width of about 10 mm and is shown in FIG. 5 in an enlarged scale. The undulating adhesive surfaces 46, 47, 48 are enlarged in the same scale.

The tolerances of the collar 33 of the transverse profile 22 and of the groove 29 in the reinforcing profile 20 are chosen such that the top flank 38 can always contact the base surface 30. The tolerances of the collar 33 and the groove 29 are in this case also chosen such that virtually all remaining adhesive 42 can be stored in the space provided between the flanks 34, 35 and the ends 44, 45. This remaining adhesive 42 also contributes to the bond between the transverse profile 20 and the reinforcing profile 22. The dimensions of the groove 29 and the collar 33 are chosen such that the reinforcing profile 20 can be positioned accurately with respect to the transverse profile 22 and such that the adhesive 42 can extend uniformly between both.

The design of a transverse beam 2 according to the invention with a reinforcing profile 20 which is glued to a light-metal transverse profile 22, is advantageous in order to produce a transverse beam 2 with a relatively great straightness. This is particularly advantageous with heddle frames 1 which have a relatively great width. This also makes it possible to produce a reliable and reproducible adhesive bond which is suitable for high-quality series production.

Figure 6:
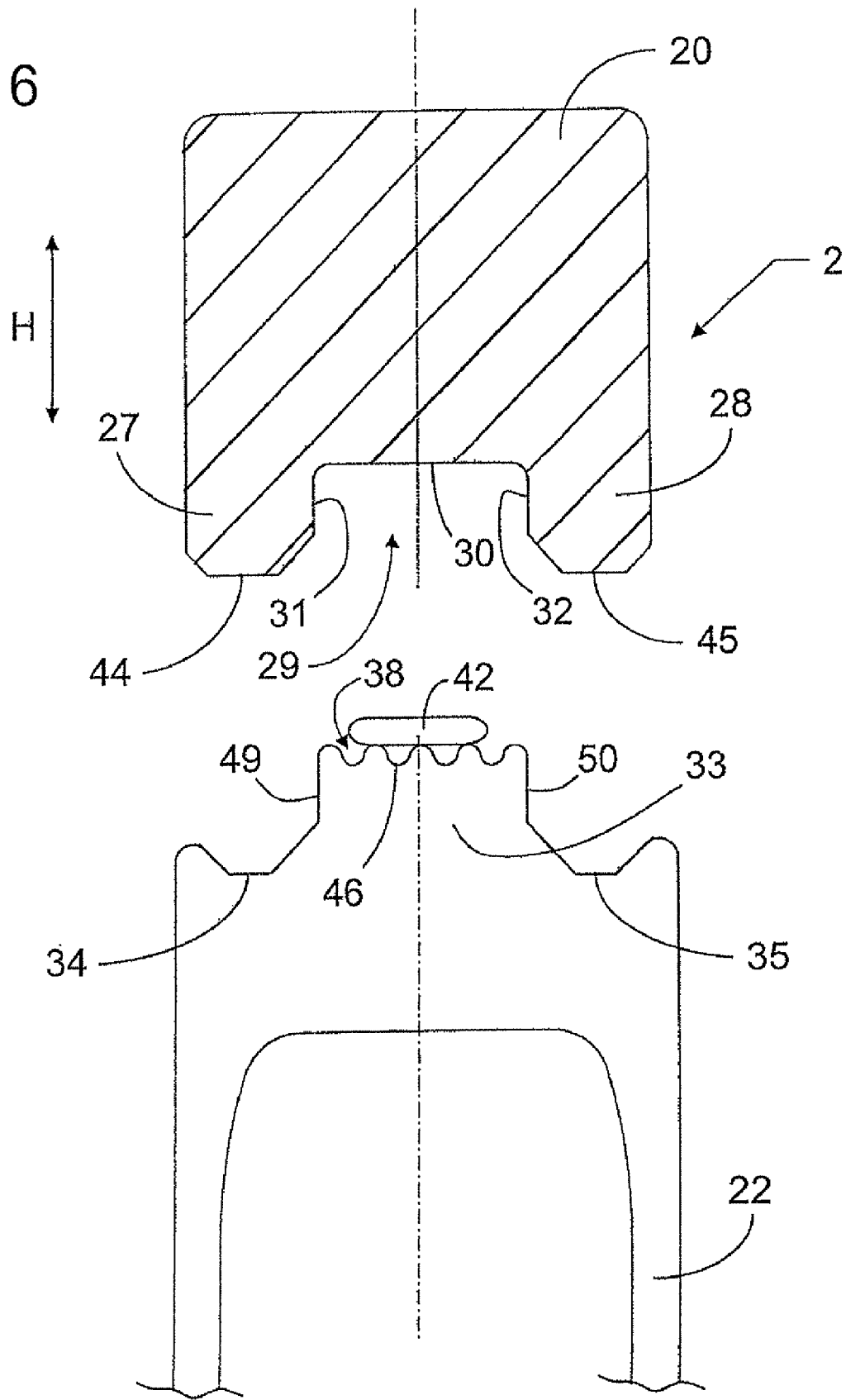
FIG. 6 shows a variant according to the invention in the non-fitted state before fitting.

With the embodiment of FIG. 6, the top flank 38 of the collar 33 of the transverse profile 22 is provided with an undulating adhesive surface 48. The side flanks 49 and 50 have a substantially flat surface. The adhesive surface 46 can also interact with adhesive 42 in order to glue the transverse profile 22 and the reinforcing profile 20 to one another. In this embodiment, the ends 44, 45 of the legs 27, 28 can interact, for example, with the flanks 34, 35 of the transverse profile 22 in order to position the reinforcing profile 20 with respect to the transverse profile 22. In this case, the transverse profile 22 and the reinforcing profile 20 can be pressed against one another with great force during gluing in their height direction H, resulting in a transverse beam 2 which is able to assume the straight shape of the reinforcing profile 20.

A transverse beam 2 according to FIGS. 1 to 6 also offers the advantage that the legs 27, 28 of the reinforcing profile 20 are hardly subjected to a lateral load. In addition, after the reinforcing profile 20 has been attached or glued, the legs 27, 28 are supported laterally by the collar 33.

It is clear that according to a variant (not shown), the lateral surfaces 31 and 32, as well as the side flanks 36, 37 or 49, 50 do not have to be arranged perfectly parallel to one another, but can also be arranged at a certain angle with respect to one another. The angles may, for example, be chosen such that the lateral surfaces 31, 32 can converge slightly towards one another from the base surface 30 towards the ends 44, 45 and/or the side flanks 36, 37 or 49, 50 can converge slightly towards one another from the top flank 38 towards the flanks 34, 35. This makes it possible for the adhesive 42 to also ensure additional mechanical fastening between both.

Figure 7:
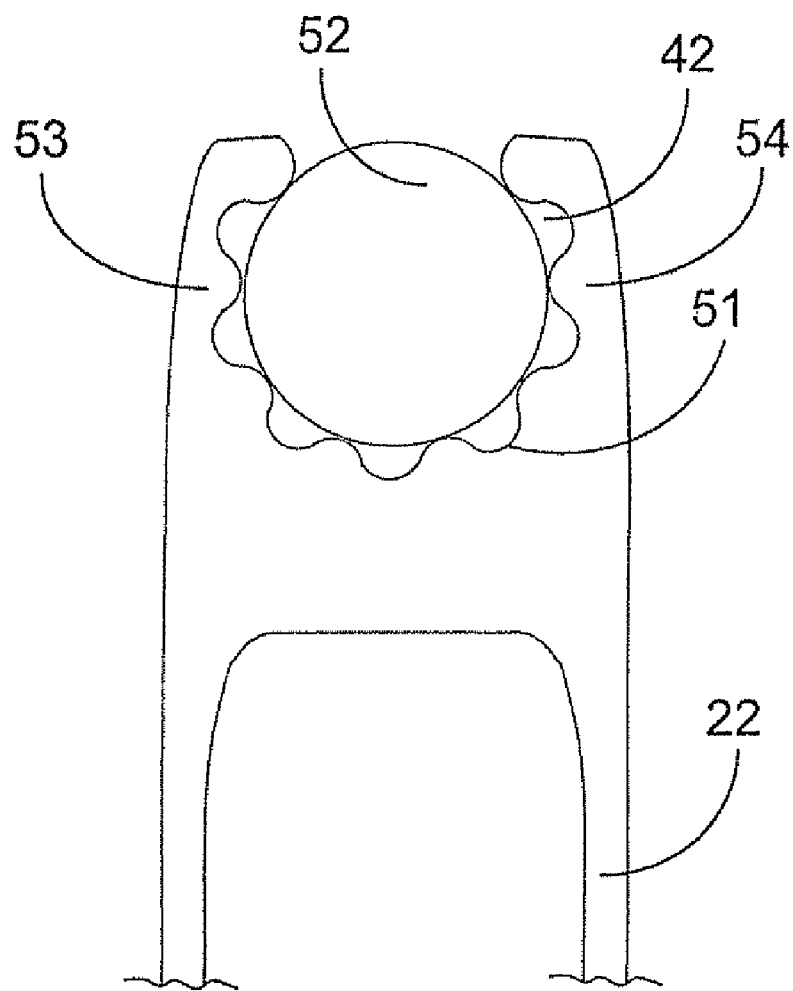
FIGS. 7, 8 and 9 shows variants according to the invention in the fitted state.
Figure 8:
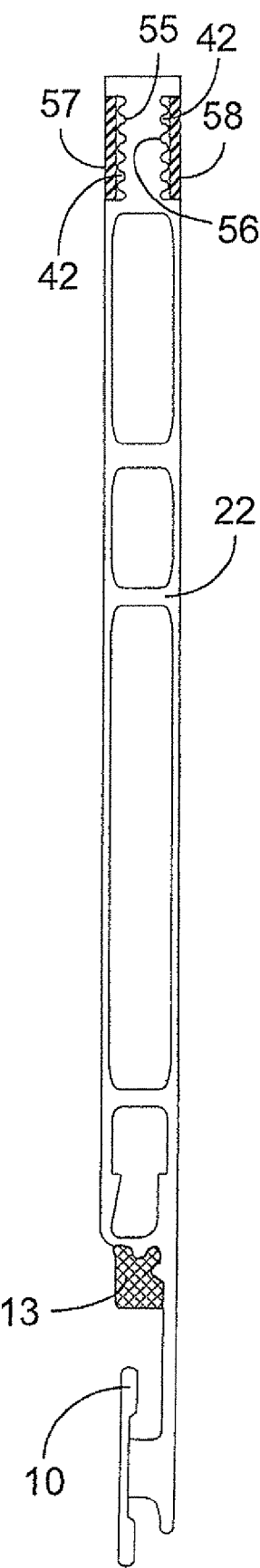
Figure 9:
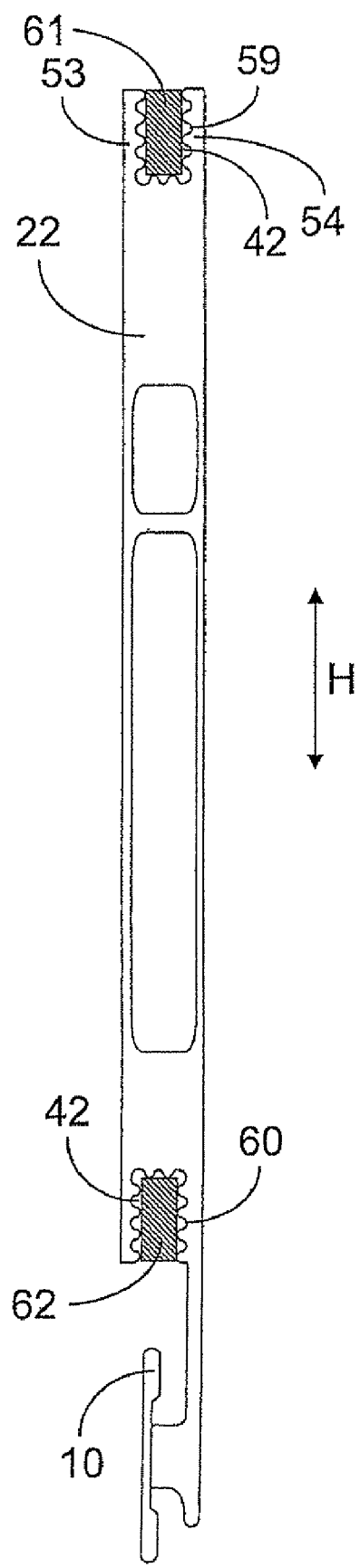

FIG. 7 shows a variant wherein a reinforcing profile 52 is arranged inside a transverse profile 22 at the position of two collars 53 and 54 of the transverse profile 22. The transverse profile 22 comprises an undulating adhesive surface 51 in order to glue the reinforcing profile 52 to the transverse profile 22 using adhesive 42. FIG. 8 shows a further variant wherein the transverse profile 22 comprises two undulating adhesive surfaces 55 and 56 in order to glue an associated reinforcing profile 57 or 58 to the transverse profile 22 using adhesive 42. The reinforcing profiles 57 and 58 are arranged laterally opposite one another. FIG. 9 shows another variant wherein the transverse profile 22 comprises two undulating adhesive surfaces 59 and 60 in order to glue an associated reinforcing profile 61 or 62 to the transverse profile 22 using adhesive. The reinforcing profiles 61 and 62 are arranged opposite one another in the height direction H. The undulating adhesive surfaces 51, 57, 58, 61, 62 can also be formed by longitudinal undulations which extend in the length direction of the transverse profile 22 and which are formed, for example, while the transverse profile is drawn through a die.

The embodiments of FIGS. 1 to 6 are more advantageous than the embodiments of FIGS. 7 to 9 for applying and spreading the adhesive 42 between the reinforcing profile and the transverse profile while both are being glued together. The embodiments of FIGS. 1 to 6 also make it possible to use a reinforcing profile 20 having a relatively great width, more particularly having a width in the order of magnitude of the entire width of the transverse profile 22. Using a centrally arranged collar 33 is also more advantageous with regard to the strength of the transverse profile 22 than using a transverse profile 22 provided with relatively weak collars 53, 54 on the side.

The transverse beam 3 with reinforcing profile 21 can be produced and constructed in a similar way to the transverse beam 2 with reinforcing profile 20. In this case, for example, the reinforcing profile 21 is provided on the underside of the heddle frame 1, which means on the outermost side of the transverse beam 3 which is situated opposite that side on which the heddle bar 11 is arranged. The transverse beam 3 may also comprise a hollow transverse profile 63 to which the reinforcing profile 21 is attached, which hollow transverse profile 63 can be of a construction similar to that of the transverse profile 22, as illustrated in one of the FIGS. 2 to 9. With the heddle frame 1 illustrated in the figures, the reinforcing profile 20 is provided at the top, while the reinforcing profile 21 is in this case provided at the bottom. In this way, the reinforcing profiles are arranged in an advantageous position in order to provide sufficient rigidity and strength to the transverse beams 2, 3 and to the heddle frame 1.

The adhesive 42 may consist of a commercially available epoxy resin, an adhesive based on acrylate, a glue or any other adhesive which can glue a transverse profile 22, 63 and an abovementioned reinforcing profile 20, 21, 52, 57, 58, 61, 62 together. In a simple embodiment, the transverse profile is formed, for example, by an extruded aluminium transverse profile, while the reinforcing profile is formed by a synthetic material containing carbon fibres.

According to a variant, an undulating adhesive surface may be provided on a reinforcing profile in order to interact with an adhesive in order to glue the reinforcing profile to a transverse profile. The adhesive surface provided on the transverse profile may in this case, for example, optionally be of an undulating design. According to the invention, an adhesive bond is formed by means of an undulating adhesive surface and the other adhesive surface which interacts with the same adhesive can assume virtually any shape, for example a flat surface, a structured surface, an undulating surface with, if desired, undulations similar to the undulations of the undulating adhesive surface.

A transverse beam 2, 3 according to the invention which comprises a reinforcing profile 20, 21, 52, 57, 58, 61, 62 is strong, able to resist bending and breaking, so that such a transverse beam 2, 3 can be of a relatively wide design. In addition, it is possible to produce a lightweight transverse beam 2, 3 of high strength.

The transverse beam, the heddle frame and the method according to the invention are obviously not limited to the embodiments described by way of example and illustrated in the figures, but can be designed in accordance with various variants and various combinations of the abovementioned embodiments without departing from the scope of the invention.

The invention claimed is:

1. Transverse beam for a heddle frame, comprising a transverse profile and a reinforcing profile glued to the transverse profile, said transverse beam having an undulating adhesive surface arranged to engage and interact with an adhesive which is disposed between the transverse profile and the reinforcing profile, and which glues the transverse profile to the reinforcing profile, said adhesive surface containing multiple wave-like undulations including valleys and peaks extending over at least a portion of the adhesive surface providing multiple wave-like undulations in an adhesive disposed between the transverse profile and the reinforcing profile.

2. Transverse beam for a heddle frame according to claim 1, wherein the transverse profile includes said undulating adhesive surface.

3. Transverse beam according to claim 2, wherein the transverse profile is provided with a collar to which the reinforcing profile is glued, said reinforcing profile having a substantially U-shaped portion and wherein the collar is fitted within a groove in the U-shaped reinforcing portion, said collar including said undulating adhesive surface.

4. Transverse beam according to claim 3, wherein the collar includes a top side and lateral flanks, wherein at least the top side of the collar has the undulating adhesive surface.

5. Transverse beam according to claim 3, wherein the collar includes a top side and lateral flanks, and wherein said top side and/or at least one lateral flank of the collar has the undulating adhesive surface.

6. Transverse beam according to claim 5, wherein a space is provided between the ends of legs of the U-shaped reinforcing profile, said space located between said ends and the transverse profile, and providing a space to receive excess adhesive during gluing of the reinforcing profile to the transverse profile.

7. Transverse beam according to claim 1, wherein the undulating adhesive surface has longitudinal undulations which extend along a length direction of the transverse beam.

8. Transverse beam according to claim 4, wherein at least a base surface of the groove in the reinforcing profile is of a structured design.

9. Transverse beam according to claim 1, wherein the transverse profile is made from light metal.

10. Transverse beam according to claim 1, wherein the reinforcing profile is made from fibre-reinforced synthetic material.

11. Heddle frame, comprising a transverse beam according to claim 1.

12. Transverse beam according to claim 9, wherein the reinforcing profile is made from fibre-reinforced synthetic material.

13. Method for making a transverse beam for a heddle frame, comprising:
    providing a transverse profile and a reinforcing profile adapted to be connected to and extend along a length of the transverse profile so that the connected transverse profile and the reinforcing profile together comprise the transverse beam;
    providing the transverse profile or the reinforcing profile with an undulating adhesive surface on a portion thereof, the adhesive surface comprising multiple, wave-like undulations having valleys and peaks extending over at least a portion of the adhesive surface;
    connecting the transverse profile to the reinforcing profile by gluing the transverse profile to the reinforcing profile along the undulating adhesive surface so that the undulating surface interacts with the adhesive to produce multiple undulations in the adhesive to hold the reinforcing profile to the transverse profile.

14. Method according to claim 13, including providing said undulating surface on one or more surfaces of a collar portion of the transverse profile, and forming the reinforcing profile with a substantially U-shaped end portion that receives said collar, said undulating adhesive surface and glue.

15. Method according to claim 13, including providing said undulating adhesive surface on a recessed portion of the transverse profile that is configured to receive at least a portion of said reinforcing profile.

* * * * *